INVENTORS
HOWELL D. GARNER
HENRY J. E. REID, JR.
ATTORNEYS

INVENTORS
HOWELL D. GARNER
HENRY J. E. REID, JR.

ATTORNEYS

United States Patent Office 3,189,299
Patented June 15, 1965

3,189,299
DYNAMIC PRECESSION DAMPER FOR SPIN STABILIZED VEHICLES
Howell D. Garner, Newport News, and Henry J. E. Reid, Jr., Yorktown, Va., assignors to the United States of America as represented by the Administrator of the National Aeronautics and Space Administration
Filed Aug. 27, 1963, Ser. No. 305,020
12 Claims. (Cl. 244—1)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of copending application Serial Number 84,962 filed January 25, 1961.

This invention relates generally to a dynamic damper and more specifically to a dynamic precession damper for spin-stabilized space vehicles.

One of the main problems encountered in controlling the attitude of a spin-stabilized space vehicle is the precessional motion of the vehicle. This may be due to outside disturbances or to the operation of an internal attitude control system. The purpose of this invention is to provide a dynamic damper which will damp out this precessional motion of the vehicle.

The prior art means for damping out precessional motion of a spin-stabilized vehicle are limited to passive damping devices such as damped pendulums and mercury filled tubes. The disadvantages of these prior art dampers are their lack of effectiveness, resulting in long periods of time required to damp small disturbances, and their limitation of use on vehicles whose greatest moments of inertia are about their spin axes.

It is, therefore, an object of this invention to provide a dynamic damper for damping out precessional motion of a spin-stabilized vehicle.

Another object of this invention is to provide a damper for damping out precessional motion of long, slim spin-stabilized vehicles.

A further object of this invention is to provide a damper for damping out the precessional motion of a spin-stabilized vehicle whose greatest moment of inertia is not about its spin axis.

Other objects and advantages of this invention will further become apparent hereinafter and in the drawings in which.

During precessional motion of a spin-stabilized space vehicle, the spin axis of the vehicle transcribes a conical path in space. As this occurs, the vehicle experiences a sinusoidal variation in angular velocity and angular acceleration about the body axes Y and Z, which lie in a plane perpendicular to the spin axis. Amplitudes of these variations are a function of the amplitude of the precessional motion and occur at a frequency which is the sum or difference of the spin frequency and the precessional frequency, depending upon the inertia ratio of the vehicle. Thus, a precessional motion of a spinning vehicle may be detected by either an angular velocity or an angular acceleration sensing instrument mounted rigidly in the vehicle with its sensitive axis perpendicular to the spin axis of the vehicle.

If a control torque is applied about a vehicle body axis perpendicular to the spin axis and if the amplitude of this torque is made a function of the output from the angular velocity or angular acceleration sensing instrument described above, and if the output of the torque producing device is in the proper angular phase relation to the output of the angular velocity or angular acceleration sensing instrument, the precessional motion of the vehicle will be reduced, and in time eliminated. Since there is a continual interchange of momentum between the Y and Z axes of the vehicle during precessional motion, application of suitable torque, about one of these axes is sufficient to damp the vehicle about both axes.

There are two preferred embodiments of this invention. The first embodiment, shown by FIG. 1, includes a rate gyroscope which produces an output proportional to the angular velocity of the spin-stabilized vehicle about the sensitive axis of the rate gyroscope. This sensitive axis is perpendicular to the spin axis of the vehicle. The output from the rate gyroscope is modified by a threshold device and then applied to a torque producing device whose torque axis is parallel to the sensitive axis of the rate gyroscope. This torque producing device, when an input is applied to it, produces a torque about the sensitive axis which tends to decrease the amplitude of the precessional motion of the vehicle.

Figure 2:
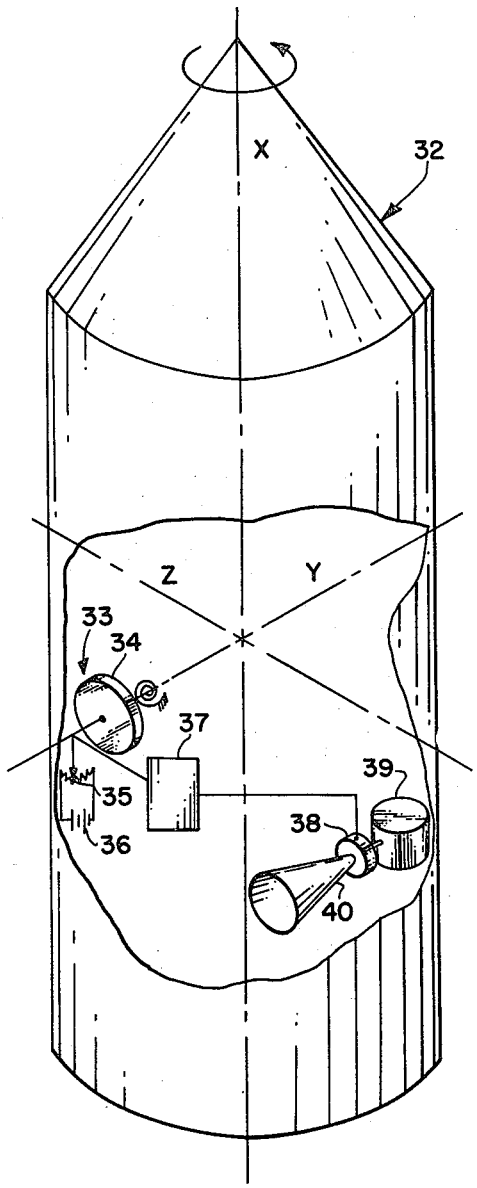
FIG. 2 shows a diagrammatic view of a second embodiment of a dynamic damper for damping out precessional motion of a spin-stabilized vehicle.

The second preferred embodiment of this invention, shown by FIG. 2, includes an angular accelerometer which produces an output proportional to the angular acceleration of the spin-stabilized vehicle about the sensitive axis of the angular accelerometer. This sensitive axis is perpendicular to the spin axis of the vehicle. The output from the angular accelerometer is modified by a threshold device and then applied to a torque producing device whose torque axis is parallel to an axis perpendicular to both the sensitive axis of the angular accelerometer and the spin axis. This torque producing device, when an input is applied to it, produces a torque which tends to decrease the amplitude of the precessional motion of the vehicle.

In describing the preferred embodiments of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Figure 1:
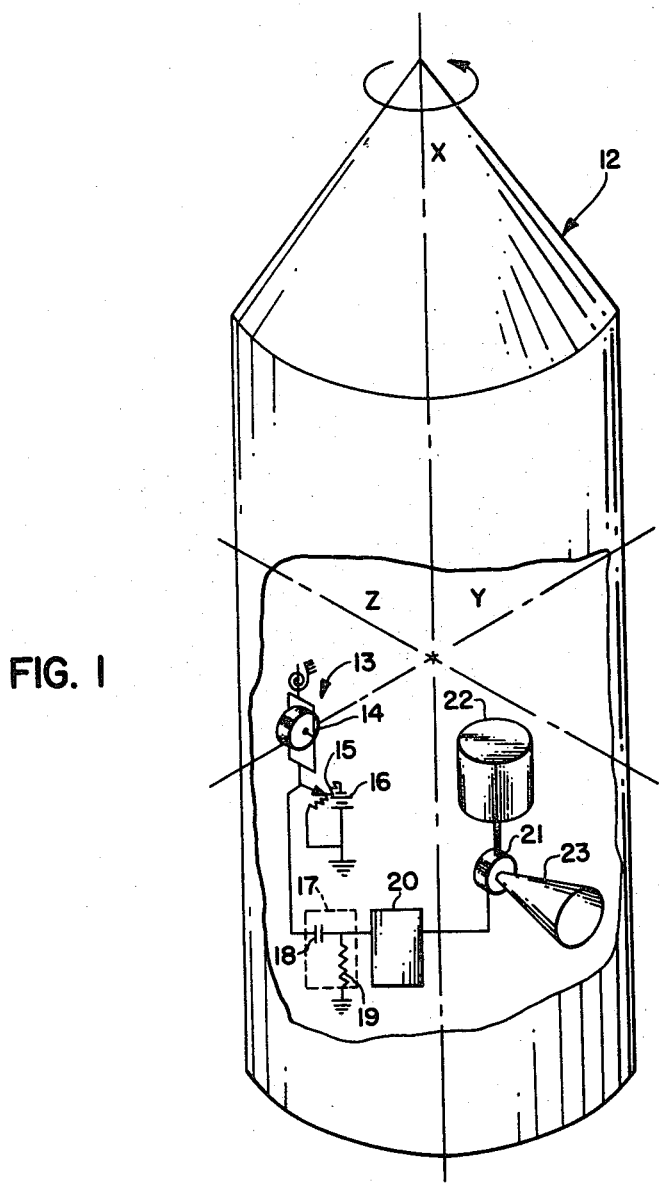
FIG. 1 shows a diagrammatic view of a first embodiment of a dynamic damper for damping out precessional motion of a spin-stabilized vehicle.

Turning now to the first specific embodiment of the invention selected for illustration in FIG. 1, the number 12 designates a spin-stabilized space vehicle having mutually perpendicular axes X, Y, and Z passing through the center of gravity of the vehicle. Axis X is the spin axis of the vehicle. Located anywhere inside or outside vehicle 12 and attached rigidly thereto is a rate gyroscope 13. Rate gyroscope 13 consists of a gyroscope 14 including a rotor and one gimbal supported to rotate about its own axis and restrained by springs, a potentiometer 15 and a voltage source 16. Gyroscope 14 produces a mechanical movement which is transformed into an electrical output by potentiometer 15 and voltage source 16. This electrical output is the output of rate gyroscope 13. The sensitive axis of rate gyroscope 13 is shown along the Y axis; however, it can be located any other place as long as it is parallel to the Y axis. Rate gyroscope 13 will sense the angular velocity of vehicle 12 about the Y axis and produce an electrical output proportional thereto. The output from potentiometer 15 is applied to a high-pass filter 17 consisting of a capacitor 18 and a resistor 19. The purpose of this high-pass filter is to remove any steady state output from gyroscope 13 due to alignment errors of the gyroscope, causing it to sense a component of the spin velocity. The parameters of the filter are selected to pass the normal sinusoidal signal of the operating frequency without appreciable phase shift, but to block any steady state output signal.

Figure 3:
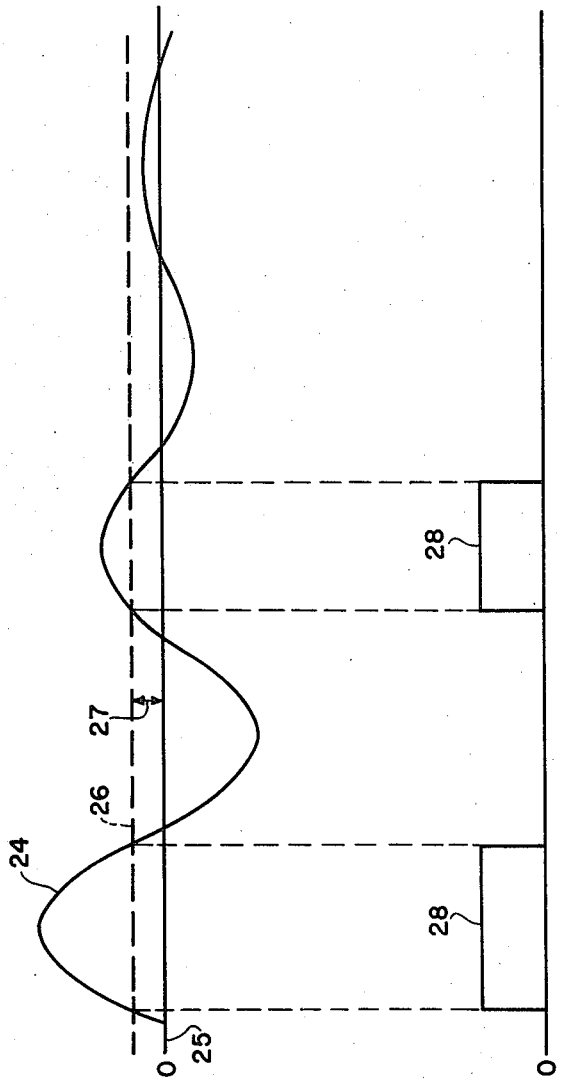
FIG. 3 shows a diagram of the inputs to and outputs from the threshold devices of both FIGS. 1 and 2.

The output from high-pass filter 17 is a sinusoidal output which could be used directly to vary the output of a torque producing device to damp out the precessional motion of vehicle 12. However, a much simpler arrangement is shown here which has been found adequate for normal applications. The output from high-pass filter 17 is applied to a threshold device 20. The function of this threshold device can best be explained by referring to FIG. 3. Assuming that rate gyroscope 13 detects an angular velocity about its sensitive axis, it will produce a sin wave output 24 about a zero axis 25 as is shown by FIG. 3. Threshold device 20 is set at some predetermined threshold value 26 the magnitude of which is indicated by arrows 27. Whenever the amplitudes of sin wave 24, which is applied to threshold device 20, exceed this threshold level the threshold device will produce constant amplitude pulses which are shown as pulses 28 in FIG. 3. Threshold devices are well known and will not be described in this application. An example of a device which can be used as threshold device 20 is the well known Schmitt trigger circuit.

The pulses 28 produced at the output of threshold device 20 are applied to a solenoid operated valve 21. Solenoid valve 21 is normally closed, but while a pulse 28 is applied to it, it will then be open. Solenoid valve 21 connects a pressurized jet fuel supply 22 to a reaction jet 23. While solenoid valve 21 is open reaction jet 23 ejects jet fuel from jet fuel supply 22 and generates a thrust. Reaction jet 23 generates a pulse of thrust each time threshold device 20 generates a pulse.

Proper phasing of the thrust pulses generated by reaction jet 23 with respect to the output generated by rate gyroscope 13 is necessary so that the thrust pulses always occur in the right direction to reduce the precessional motion of vehicle 12. This is accomplished by placing reaction jet 23 so that its torque axis is parallel to the sensitive axis of rate gyroscope 13. In this position, the pulses of thrust generated by reaction jet 23 will produce a torque about the Y axis of vehicle 12 which will reduce the precessional motion of vehicle 12. Undesirable system phase lags, such as timelags in the torque producing device may be compensated for by slightly changing the torque axis of reaction jet 23.

The operation of the embodiment of this invention shown in FIG. 1 will now be described. Whenever precessional motion occurs, rate gyroscope 13 will produce a sinusoidal output. This sinusoidal output is proportional to the angular velocity of vehicle 12 about the sensitive axis of rate gyroscope 13. The output from rate gyroscope 13 is filtered by high-pass filter 17 and then applied to threshold device 20. This threshold device produces pulses 28 shown in FIG. 3. These pulses open solenoid valve 21 and allow jet fuel to be ejected by reaction jet 23. The thrust generated by reaction jet 23 produces a torque about the Y axis of vehicle 12. This reduces the processional motion of vehicle 12 and thus reduces an output of rate gyroscope 13.

Turning now to FIG. 2 there is shown a second specific embodiment of the invention selected for illustration. The number 32 designates generally a spin-stabilized space vehicle having mutually perpendicular axes X, Y, and Z passing through the center of gravity of the vehicle. Axis X is the spin axis of the vehicle. Located anywhere inside or outside vehicle 32 and attached rigidly thereto is an angular accelerometer 33. Angular accelerometer 33 consists of a disk 34, a potentiometer 35 and a voltage source 36. Disk 34 is a symmetrical mass mounted so that it may deflect about its center of gravity. This angular deflection, restrained by a spring, is proportional to angular acceleration. This angular deflection is detected by an electric pickup consisting of potentiometer 35 and voltage source 36. The sensitive axis of angular accelerometer 33 is shown along the Y axis; however, it can be located any other place as long as it is parallel to the Y axis. Angular accelerometer 33 will sense the angular acceleration of vehicle 32 about the Y axis and produce an electrical output proportional thereto. The output of potentiometer 35 is applied to a threshold device 37 which is identical to threshold device 20 in FIG. 1. The pulse output of threshold device 37 is applied to a solenoid operated valve 38 which is normally closed. Whenever a pulse is applied to solenoid valve 38 it will open and connect a pressurized jet fuel supply 39 to a reaction jet 40. The torque axis of reaction jet 40 is nominally parallel to axis Z. The torque axis of reaction jet 40 can be changed slightly to compensate for undesirable system phase lags.

The operation of the embodiment shown in FIG. 2 will now be described. Whenever processional motion occurs, angular acceleration is produced about the sensitive axis of angular accelerometer 33. This angular acceleration is detected and a signal proportional thereto is produced by angular accelerometer 33. This signal is sinusoidal and is applied to the threshold device 37 which produces pulses 28 in the same way that threshold device 20 produces pulses. These pulses 28 are applied to solenoid valve 38 causing the reaction jet 40 to produce pulses of thrust. These pulses of thrust produce a torque about the Z axis of vehicle 32. This reduces the precessional motion of vehicle 32 and thus reduces the output of angular accelerometer 33.

The advantages of this invention is that it provides much more rapid damping than previously used passive damper, since much higher values of torque are easily available. It is usable on long, slim vehicles whose smallest moment of inertia is about the spin axis. Previous dampers will not work on this configuration. This invention is easily integrated into the type of attitude control system described in copending application Serial Number 84,962 as it can share the same torque-producing device.

It is to be understood that the form of the invention herewith shown and described is to be taken as preferred embodiments. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the following claims:

What is claimed as new and desired to be secured by Letters Patent of the United States is:

1. A dynamic precession damper for a spin stabilized vehicle comprising: means attached to said vehicle for producing a signal related to an angular movement of said vehicle about an axis in a plane perpendicular to the spin axis of said vehicle; and a torque producing means energized by said first means for producing a torque about an axis contained in said plane whereby said angular movement is decreased.

2. A dynamic precession damper for a spin stabilized vehicle is claimed in claim 1 wherein said first means includes a threshold device.

3. A dynamic precession damper for a spin stabilized vehicle is claimed in claim 1 wherein said torque producing means includes a reaction jet.

4. A dynamic precession damper for a spin stabilized vehicle comprising: means for producing a signal proportional to an angular movement of said vehicle about an axis in a plane perpendicular to the spin axis of said vehicle; means for producing a pulse each time said signal exceeds a predetermined amplitude; and means energized by said pulse for producing a torque about an axis in said plane whereby said angular movement is decreased.

5. A dynamic precession damper for a spin stabilized vehicle as claimed in claim 4 wherein said means for producing a signal is a rate gyroscope.

6. A dynamic precession damper for a spin stabilized vehicle as claimed in claim 4 wherein said means for producing a signal is an angular accelerometer.

7. A dynamic precession damper for a spin stabilized vehicle comprising: means for producing a signal proportional to the angular velocity of said vehicle about a sensitive axis perpendicular to the spin axis of said vehicle; and a torque producing means whose torque axis is parallel to said sensitive axis connected to said first means for producing a torque about said sensitive axis proportional to said angular velocity.

8. A dynamic precession damper for a spin stabilized vehicle is claimed in claim 7 wherein said first mentioned means includes a rate gyroscope.

9. A dynamic precession damper for a spin stabilized vehicle as claimed in claim 8 wherein said first mentioned means includes a threshold device for producing an output only while said signal exceeds a predetermined amplitude.

10. A dynamic precession damper for a spin stabilized vehicle comprising: means for producing a signal proportional to the angular acceleration of said vehicle about a sensitive axis perpendicular to the spin axis of said vehicle; and a torque producing means energized by said first means for producing a torque proportional to said signal about an axis perpendicular to both said sensitive axis and said spin axis.

11. A dynamic precession damper for a spin stabilized vehicle comprising: a rate gyroscope having a sensitive axis perpendicular to the spin axis of said vehicle for producing an electrical signal proportional to the angular velocity of said vehicle about said sensitive axis; a high pass filter for removing from said electrical signal any steady state component due to alignment errors of said gyroscope causing it to sense a component of the spin velocity of said vehicle; a threshold device connected to said high pass filter for producing an output only while said signal exceeds a predetermined amplitude; a reaction jet having its torque axis parallel to said sensitive axis; a jet fuel supply; and a solenoid valve connected between said jet fuel supply and said reaction jet, to be controlled by the output from said threshold device whereby when said spin stabilized vehicle precesses said reaction jet will produce a torque which will reduce said precession.

12. A dynamic precession damper for a spin stabilized vehicle comprising: an angular accelerometer having a sensitive axis perpendicular to the spin axis of said vehicle for producing an electrical signal proportional to the angular acceleration of said vehicle about said sensitive axis; a threshold device connected to receive said electrical signal for producing an output only while said signal exceeds a predetermined amplitude; a reaction jet having its torque axis perpendicular to both said sensitive axis and said spin axis; a jet fuel supply; and a solenoid valve connected, between said jet fuel supply and said reaction jet, to be controlled by the output from said threshold device whereby when said spin stabilized vehicle precesses said reaction jet will produce a torque which will reduce said precession.

References Cited by the Examiner
UNITED STATES PATENTS 2,991,027 7/61 Geyling _____ 102—51 X
3,048,350 8/62 Gutler _____ 244—1

OTHER REFERENCES

"Navigation," Spring 1958, vol. 6, No. 1, pages 66–71 relied on.
"Aviation Week," Oct. 12, 1959, pages 26 and 27.
"Astronautics," September 1962, pages 25-29.

FERGUS S. MIDDLETON, *Primary Examiner.*